(12) United States Patent
Kim et al.

(10) Patent No.: US 11,179,994 B2
(45) Date of Patent: Nov. 23, 2021

(54) HEAT PUMP FOR AUTOMOBILE

(71) Applicant: ESTRA AUTOMOTIVE SYSTEMS CO., LTD., Daegu (KR)

(72) Inventors: Jong Won Kim, Daegu (KR); Ho Young Jang, Daegu (KR); Jun Ho Choi, Daegu (KR)

(73) Assignee: ESTRA AUTOMOTIVE SYSTEMS CO., LTD., Daegu (KR)

(*) Notice: Subject to any disclaimer, the term of this patent is extended or adjusted under 35 U.S.C. 154(b) by 35 days.

(21) Appl. No.: 16/474,219

(22) PCT Filed: Dec. 28, 2017

(86) PCT No.: PCT/KR2017/015685
§ 371 (c)(1),
(2) Date: Jun. 27, 2019

(87) PCT Pub. No.: WO2018/124788
PCT Pub. Date: Jul. 5, 2018

(65) Prior Publication Data
US 2019/0351739 A1    Nov. 21, 2019

(30) Foreign Application Priority Data

Dec. 29, 2016  (KR) .......................... 10-2016-0183076

(51) Int. Cl.
*B60H 1/00*        (2006.01)
*B60H 1/14*        (2006.01)
(Continued)

(52) U.S. Cl.
CPC ..... *B60H 1/00385* (2013.01); *B60H 1/00885* (2013.01); *B60H 1/00899* (2013.01);
(Continued)

(58) Field of Classification Search
CPC .......... B60H 1/00385; B60H 1/00392; B60H 1/00492; B60H 1/00499; B60H 1/00885;
(Continued)

(56) References Cited

U.S. PATENT DOCUMENTS 5,598,887 A  * 2/1997 Ikeda ................. B60H 1/00392
                                                  165/202
2004/0134217 A1* 7/2004 Itoh ........................ F24F 3/153
                                                  62/324.1
(Continued)

FOREIGN PATENT DOCUMENTS

JP    2008-120217 A    5/2008
JP    2015-000620 A    1/2015
(Continued)

OTHER PUBLICATIONS

Search Report, dated Apr. 5, 2018, for International Application No. PCT/KR2017/015685.
(Continued)

*Primary Examiner* — Frantz F Jules
*Assistant Examiner* — Jason N Thompson
(74) *Attorney, Agent, or Firm* — LRK Patent Law Firm

(57) ABSTRACT

A heat pump for a vehicle is provided in which the heat pump includes a compressor, an inner heat exchanger, an outer heat exchanger, a first expansion unit, a second expansion unit, an evaporator, an accumulator, a third heat exchanger, a first directional control valve, a second directional control valve, and a dehumidification line, and performs cooling, heating, defrosting, and dehumidifying operations according to the flow of a refrigerant.

5 Claims, 6 Drawing Sheets

(51) Int. Cl.
  *B60H 1/22* (2006.01)
  *B60H 1/32* (2006.01)
  *B60H 1/03* (2006.01)
  *F25B 27/02* (2006.01)
  *F25B 30/06* (2006.01)
  *F25B 47/02* (2006.01)
  *F25B 49/02* (2006.01)

(52) U.S. Cl.
  CPC ............. *B60H 1/039* (2019.05); *B60H 1/143* (2013.01); *B60H 1/32281* (2019.05); *F25B 27/02* (2013.01); *F25B 30/06* (2013.01); *F25B 47/022* (2013.01); *F25B 49/02* (2013.01); *B60H 2001/00928* (2013.01); *B60H 2001/00949* (2013.01); *B60H 2001/00961* (2019.05)

(58) Field of Classification Search
  CPC ........ B60H 1/00899; B60H 1/14; B60H 1/43; B60H 1/2215; B60H 1/2218; B60H 1/3228; B60H 1/32281; B60H 1/32284; B60H 1/034; B60H 1/039
  USPC .......................................................... 165/240
  See application file for complete search history.

(56) References Cited

U.S. PATENT DOCUMENTS

| | | | |
|---|---|---|---|
| 2009/0191804 A1* | 7/2009 | Goenka | B60H 1/323 454/75 |
| 2012/0266624 A1* | 10/2012 | Inaba | F25B 1/10 62/324.6 |
| 2012/0318012 A1* | 12/2012 | Choi | B60H 1/00921 62/129 |
| 2013/0291577 A1* | 11/2013 | Miyakoshi | B60L 1/02 62/151 |
| 2015/0121930 A1* | 5/2015 | Kasuya | B60H 1/00921 62/238.6 |
| 2015/0217625 A1* | 8/2015 | Kang | F25B 30/06 62/160 |
| 2015/0273981 A1* | 10/2015 | Kang | B60H 1/3228 62/324.6 |
| 2016/0016456 A1* | 1/2016 | Kang | B60H 1/00907 165/42 |
| 2018/0065451 A1* | 3/2018 | Choi | B60H 1/3213 |

FOREIGN PATENT DOCUMENTS

| | | |
|---|---|---|
| KR | 10-2007-0075119 A | 7/2007 |
| KR | 10-1241222 B1 | 3/2013 |
| KR | 10-1342931 B1 | 12/2013 |
| KR | 10-2014-0097688 A | 8/2014 |
| KR | 10-1448656 B1 | 10/2014 |
| KR | 10-1669826 B1 | 10/2016 |

OTHER PUBLICATIONS

Written Opinion, dated Apr. 5, 2018, for International Application No. PCT/KR2017/015685.

* cited by examiner

HEAT PUMP FOR AUTOMOBILE

CROSS-REFERENCE TO RELAYED APPLICATIONS

The present application is a U.S. National Phase entry from International Application No. PCT/KR2017/015685, filed Dec. 28, 2017, which claims priority to Korean Patent Application No. 10-2016-0183076, filed Dec. 29, 2016, the disclosures of which are incorporated by reference herein in their entirety.

BACKGROUND

1. Technical Field

The present invention relates generally to a heat pump for a vehicle and, more particularly, to a heat pump for a vehicle which includes a first directional control valve, a second directional control valve, a dehumidification line, and so on and performs cooling/heating/defrosting/dehumidifying operations according to the flow of a refrigerant.

2. Description of Related Art

In recent years, a desire to introduce vehicles using alternative energy as a power source or low emission vehicles in association with global environment issues and a request to improve an atmospheric environment has been rising.

Thus, electric vehicles using a battery and an electric motor and hybrid vehicles using an electric motor in combination with an engine as a driving source have attracted attention as vehicles using alternative energy.

In the case of general internal combustion engines using light oil or heavy oil as fuel, a heating operation can be performed using a heat source from the internal combustion engine. However, in the case of the electric vehicles, neither an engine nor a coolant is provided as a heat source, and thus there is no choice but to depend on a battery. There is a technical difficulty in that a traveling distance of the vehicle is remarkably reduced when heating is performed using the battery. In the case of the hybrid vehicles, there is a motor travel mode in which the engine is stopped and the vehicle is driven by only the electric motor. Since the hybrid vehicle must be driven by only a capacity of the battery in the motor travel mode, the case where a sufficient heat source is not secured during heating may occur as in electric vehicles. Therefore, if air conditioners mounted in vehicles using a general engine are applied to the electric vehicles and the hybrid vehicles with no change, there occurs a problem that a heat source during a heating operation or a driving force of a compressor during a cooling operation is not sufficiently provided.

For this reason, there is a need to overcome a limit of conventional air conditioners when an attempt is made to perform air conditioning on electric vehicles or hybrid vehicles. As one of methods for overcoming this problem, a method of applying a heat pump utilized mainly as a household air conditioner to the vehicles has been proposed.

The heat pump refers to a device that absorbs low-temperature heat and transfers the absorbed heat to high-temperature heat. As an example, the heat pump has a cycle in which a liquid refrigerant is evaporated in an evaporator, absorbs heat around the evaporator, and becomes a gas refrigerant, and the gas refrigerant is liquefied by a condenser that releases heat. If the heat pump is applied to electric vehicles and hybrid vehicles, there is an advantage that the heat source that is insufficient for the conventional general air conditioner can be secured.

Meanwhile, if open air has a temperature too low during a heating operation of a heat pump vehicle, a phenomenon in which frost is formed on an outer heat exchanger occurs, and thus a defrosting operation is required. In this case, most related arts adopt a method of switching a refrigerant flow in a direction opposite to a direction in which a refrigerant circulates during a heating operation for defrosting a heat pump.

However, this switching of the circulating direction of the refrigerant is responsible for reducing heating performance of an inner heat exchanger, and leads to a result of failing to provide heating during a defrosting operation if necessary. This goes against an aim of introducing a heat pump system for securing a heating heat source. Thus, this problem is recognized as a greatest factor which a vehicle equipped with the heat pump system should overcome.

Various studies have been made to solve this problem by vehicle manufacturers of various countries. However, an effective method for solving a problem with a drop in heating performance during the defrosting operation of the heat pump is insufficient so far.

SUMMARY

It is well known that remodeling of the conventional air conditioner or development of a new concept air conditioner is required since there is a limit to the battery for the vehicle. Thus, there is a need to develop an air conditioner suitable for an electric vehicle or a hybrid vehicle along with development of alternative energy which is increasingly emphasized.

To this end, there is a need to adopt the heat pump. Furthermore, the aforementioned problem with a drop in heating performance should be solved first by adopting the heat pump.

To be specific, if the heating operation is performed when the temperature of the open air is low, the phenomenon occurs in which frost is formed on the outer heat exchanger. Due to the formed frost, heat exchange is not efficient at the outer heat exchanger, which leads to a problem that the heating performance is dropped. Therefore, the present invention is directed to proposing a configuration of a heat pump for preventing frost from being formed on an outer heat exchanger while maintaining maximum heating performance when a temperature of open air is low, and a method of operating the heat pump.

According to an embodiment of the present invention in order to solve the aforementioned problem, a heat pump for a vehicle includes: a compressor configured to compress and discharge a refrigerant; an inner heat exchanger configured to allow a heat exchange between the refrigerant and air in an interior of the vehicle; an outer heat exchanger configured to allow a heat exchange between the refrigerant and open air; a first directional control valve configured to supply the refrigerant discharged from the compressor either to the inner heat exchanger or toward the outer heat exchanger without going through the inner heat exchanger according to air conditioning modes of the vehicle; a first expansion means disposed on a refrigerant line between the inner heat exchanger and the outer heat exchanger and provided to allow expansion of the refrigerant; a second expansion means disposed on the refrigerant line and provided to allow expansion of the refrigerant that has passed through the outer heat exchanger; an evaporator provided at a rear end of the second expansion means; an accumulator configured to introduce a gas-phase refrigerant, which is selected from liquid-phase and gas-phase refrigerants in the refrigerant line, into the compressor; a third heat exchanger provided to exchange heat with a waste heat collection part on the refrigerant line formed to allow the refrigerant to flow into the accumulator without passing through the evaporator; and a second directional control valve configured to supply the refrigerant which has passed through the outer heat exchanger either to the second expansion means or toward the third heat exchanger without going through the second expansion means. The heat pump for a vehicle further includes a phase change material (PCM) configured to store heat generated from the inner heat exchanger on the refrigerant line and to release latent heat into an air conditioner case when the refrigerant is directly discharged from the compressor to the outer heat exchanger in a defrosting operation mode. The heat pump is used in an electric vehicle or a hybrid vehicle.

The third heat exchanger may be coupled parallel to the evaporator on the refrigerant line between the second directional control valve and the accumulator.

Further, the waste heat collection part may include an electronic component waste heat collection part and a cabin room waste heat collection part.

According to the embodiment, the first expansion means may be an electromagnetic expansion means that is formed to selectively allow full opening of the refrigerant line.

In addition, the heat pump for a vehicle may further include a phase change material (PCM) configured to store heat generated from the inner heat exchanger on the refrigerant line.

According to the embodiment, the PCM may be formed integrally with the inner heat exchanger.

According to the embodiment, a first defrosting operation mode of the heat pump may perform defrosting through a behavior of the first directional control valve that supplies the refrigerant toward the outer heat exchanger without passing through the inner heat exchanger and a behavior of the second directional control valve that supplies the refrigerant to the second expansion means. In this case, a behavior in which the first expansion means is fully open and the second expansion means decompresses and expands the refrigerant may be included in the behavior.

According to the embodiment, a second defrosting operation mode of the heat pump may perform defrosting through a behavior of the first directional control valve that supplies the refrigerant toward the inner heat exchanger and a behavior of the second directional control valve that supplies the refrigerant to the second expansion means. In this case, a behavior in which the first expansion means is fully open and the second expansion means decompresses and expands the refrigerant may be included in the behavior.

In addition, the heat pump may further include a dehumidification line configured to directly supply the refrigerant to a rear end of the second expansion means at a rear end of the first expansion means, and an ON-OFF valve configured to open/close the dehumidification line.

According to another embodiment of the present invention, a method of operating a heat pump for a vehicle, in which: a compressor, a first directional control valve, an inner heat exchanger, a first expansion means, an outer heat exchanger, a second directional control valve, a second expansion means, an evaporator provided at a rear end of the second expansion means, a third heat exchanger, and accumulator are disposed on a refrigerant line; the third heat exchanger is disposed on the refrigerant line formed such that a refrigerant flows into the accumulator without passing through the evaporator; and a phase change material (PCM) is provided on one side of the inner heat exchanger, includes: supplying the refrigerant discharged from the compressor either to the inner heat exchanger or the outer heat exchanger without going through the inner heat exchanger using the first directional control valve according to air conditioning modes of the vehicle; supplying the refrigerant which has passed through the outer heat exchanger either to the second expansion means or toward the third heat exchanger without going through the second expansion means using the second directional control valve; and forming a dehumidification line that directly supplies the refrigerant to a rear end of the second expansion means at a rear end of the first expansion means, and an ON-OFF valve that opens/closes the dehumidification line. A cooling operation, a heating operation, a first defrosting operation, a second defrosting operation, and a dehumidifying-heating operation are performed by behaviors of the first directional control valve, the second directional control valve, and the ON-OFF valve of the dehumidification line. During the first defrosting operation and the second defrosting operation, a door inside an air conditioner case is opened to maintain heating performance. During the first defrosting operation, the refrigerant discharged from the compressor is supplied to the outer heat exchanger by preventing it from passing through the inner heat exchanger, and a heating heat source inside the vehicle is provided through the PCM. During the second defrosting operation, the refrigerant discharged from the compressor passes through the inner heat exchanger, and then is supplied to the outer heat exchanger.

According to the other embodiment, a cooling operation mode may cause the refrigerant to pass through the compressor, the first expansion means, the outer heat exchanger, the second expansion means, the evaporator, the accumulator, and the compressor in order, and fully open the first expansion means.

Further, a heating operation mode may cause the refrigerant to pass through the compressor, the inner heat exchanger, the first expansion means, the outer heat exchanger, the third heat exchanger, the accumulator, and the compressor in order.

Further, a first defrosting operation mode may cause the refrigerant to pass through the compressor, the first expansion means, the outer heat exchanger, the second expansion means, the evaporator, the accumulator, and the compressor in order, and fully open the first expansion means.

According to the other embodiment, in the first defrosting operation mode, the method of operating a heat pump may further include heating an interior of the vehicle using latent heat when the PCM is cooled. Here, the heating caused by the PCM may refer to being different from a main heating operation mode according to circulation of the refrigerant of the heat pump as an auxiliary heating concept.

Further, a second defrosting operation mode may cause the refrigerant to pass through the compressor, the inner heat exchanger, the first expansion means, the outer heat exchanger, the second expansion means, the evaporator, the accumulator, and the compressor in order, and fully open the first expansion means.

In addition, a dehumidifying-heating operation mode may cause the refrigerant to pass through the compressor, the inner heat exchanger, the first expansion means, the outer heat exchanger, the third heat exchanger, the accumulator, and the compressor in order, partly ramify a flow of the refrigerant to the dehumidification line, and supply the refrigerant toward the evaporator.

Advantageous Effects

The related art has provided a heating system that does not provide heating during a defrosting operation or has significantly reduced heating efficiency. However, according to the embodiment of the present invention, a heating system having the same heating efficiency during a defrosting operation can be provided.

To be more specific, according to a heat pump system of the present invention, in a case where a defrosting operation is required, the defrosting operation is possible without reversing a circulating direction of the refrigerant during a heating operation, and thus an effect of improving heating performance during the defrosting operation compared to the related art is exhibited ultimately.

Further, according to the embodiment of the present invention, a heat source that is insufficient when a temperature of open air is low is compensated using waste heat of an electronic component, a cabin room, or the like, and an effect of improving a heating ability is exhibited.

Furthermore, according to the embodiment of the present invention, a high-temperature high-pressure refrigerant is prevented from passing through the inner heat exchanger during a cooling operation, and thus an effect of preventing heat pick-up is exhibited.

In addition, a separate dehumidification line is provided, and thereby a dehumidifying effect is maximized during a dehumidifying-heating operation.

DETAILED DESCRIPTION OF THE INVENTION

Figure 1:
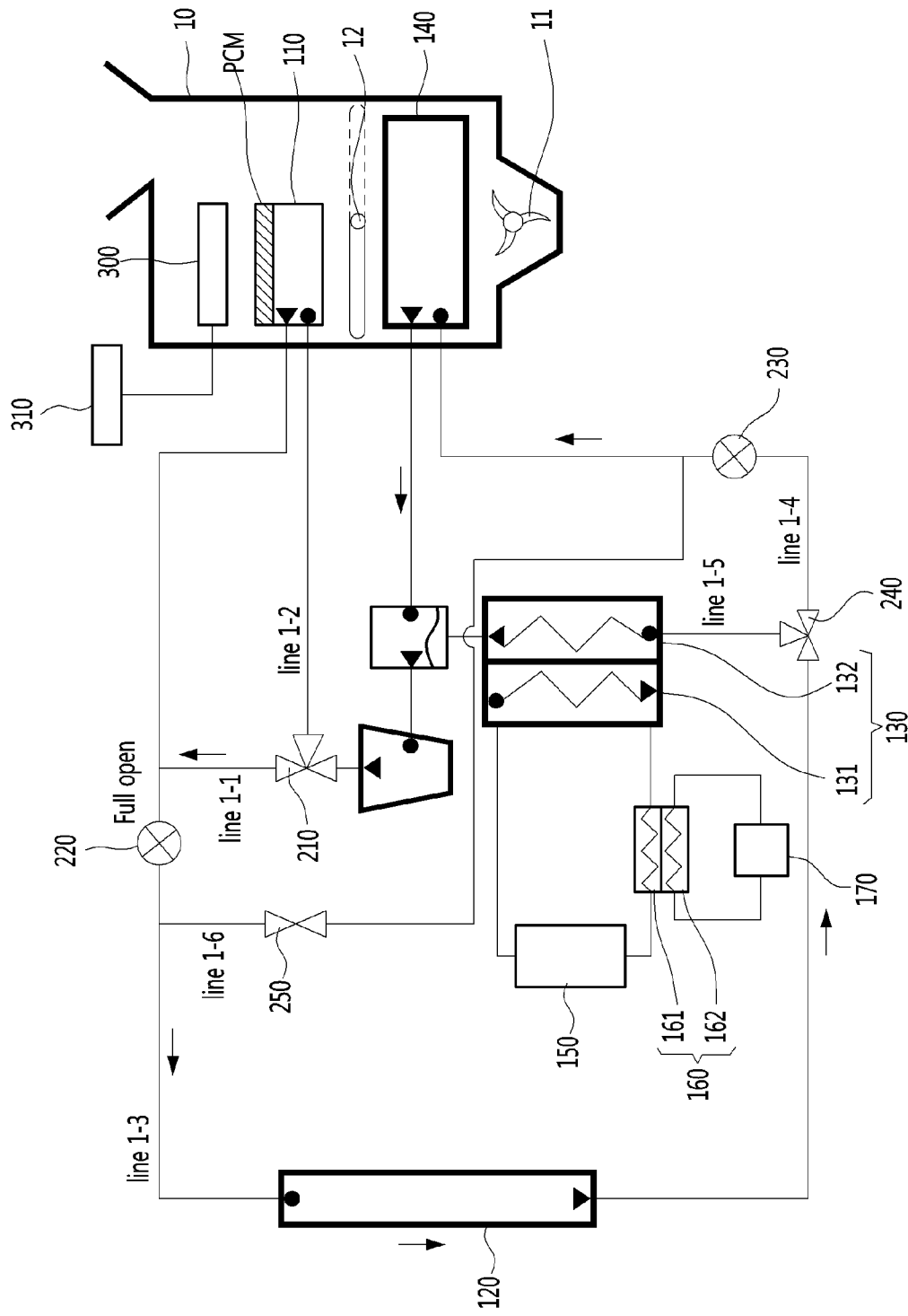
FIG. 1 is a diagram illustrating a circulation path of a refrigerant in a cooling operation mode in a configuration of a heat pump system according to an embodiment of the present invention.

According to an embodiment of the present invention, a heat pump for a vehicle includes: a compressor configured to compress and discharge a refrigerant; an inner heat exchanger configured to allow a heat exchange between the refrigerant and air in an interior of the vehicle; an outer heat exchanger configured to allow a heat exchange between the refrigerant and open air; a first directional control valve configured to supply the refrigerant discharged from the compressor either to the inner heat exchanger or toward the outer heat exchanger without going through the inner heat exchanger according to air conditioning modes of the vehicle; a first expansion means disposed on a refrigerant line between the inner heat exchanger and the outer heat exchanger and provided to allow expansion of the refrigerant; a second expansion means disposed on the refrigerant line and provided to allow expansion of the refrigerant that has passed through the outer heat exchanger; an evaporator provided at a rear end of the second expansion means; an accumulator configured to introduce a gas-phase refrigerant selected from liquid-phase and gas-phase refrigerants in the refrigerant line into the compressor; a third heat exchanger provided to exchange heat with a waste heat collection part in the refrigerant line formed to allow the refrigerant to flow into the accumulator without passing through the evaporator; and a second directional control valve configured to supply the refrigerant which has passed through the outer heat exchanger either to the second expansion means or toward the third heat exchanger without going through the second expansion means. The heat pump for a vehicle further includes a phase change material (PCM) configured to store heat generated from the inner heat exchanger on the refrigerant line and to release latent heat into an air conditioner case when the refrigerant is directly discharged from the compressor to the outer heat exchanger in a defrosting operation mode. The heat pump is used in an electric vehicle or a hybrid vehicle.

Hereinafter, a heat pump for a vehicle of the present invention will be described in detail with reference to the attached drawings. Embodiments to be described are provided to enable those skilled in the art to easily understand the technical spirit of the present invention, and the present invention is not limited thereto. Further, matters illustrated in the attached drawings may be different from forms embodied actually by drawings schematized to easily describe the embodiments of the present invention.

An expression that "includes" some components is an expression of an "open type" which merely indicates that the components are present and should not be construed as precluding additional components.

Furthermore, when a component is referred to as being coupled or connected to another component, it should be understood that the component can be directly coupled or connected to the other component, or be indirectly coupled or connected to the other component with one or more intervening components interposed therebetween.

Further, expressions such as "first", "second", etc. are expressions used only to distinguish a plurality of components, and do not limit the order of the components or other features.

A heat pump system for a vehicle and a method of operating a heat pump of the present invention will be described with reference to FIGS. 1 to 6.

Figure 2:
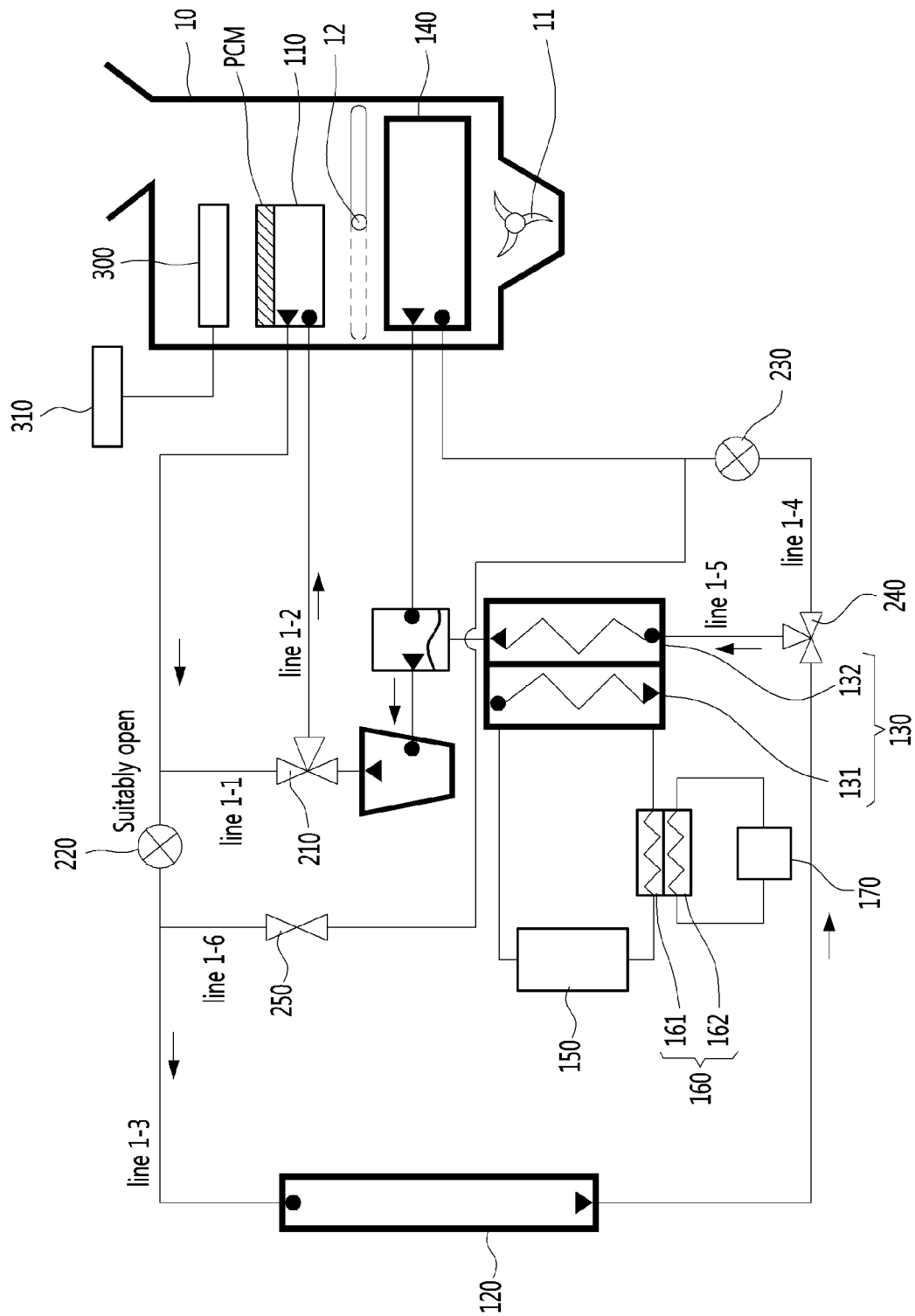
FIG. 2 is a diagram illustrating a circulation path of a refrigerant in a heating operation mode in the configuration of the heat pump system according to the embodiment of the present invention.
Figure 3:
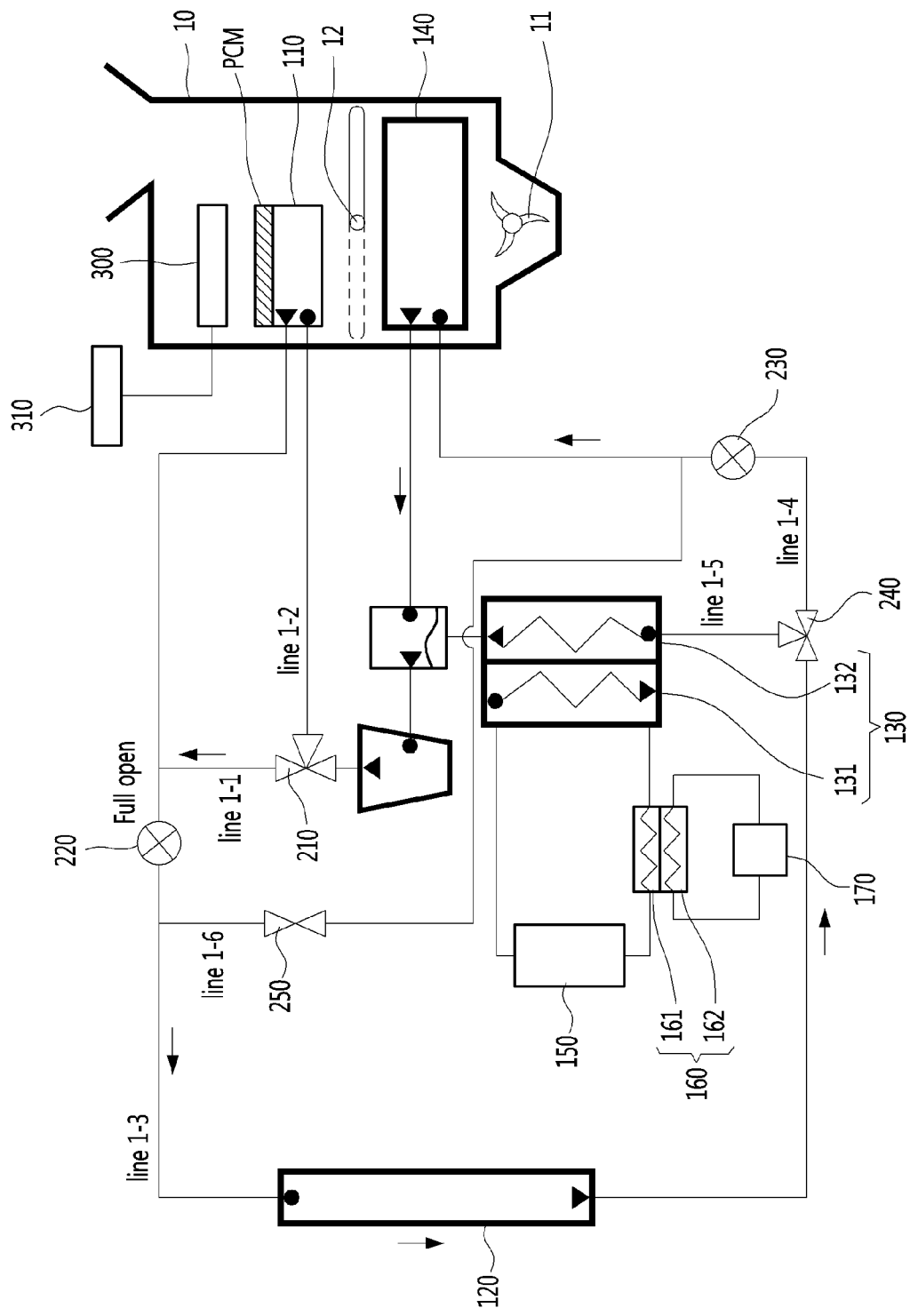
FIG. 3 is a diagram illustrating a circulation path of a refrigerant in a first defrosting operation mode in the configuration of the heat pump system according to the embodiment of the present invention.
Figure 4:
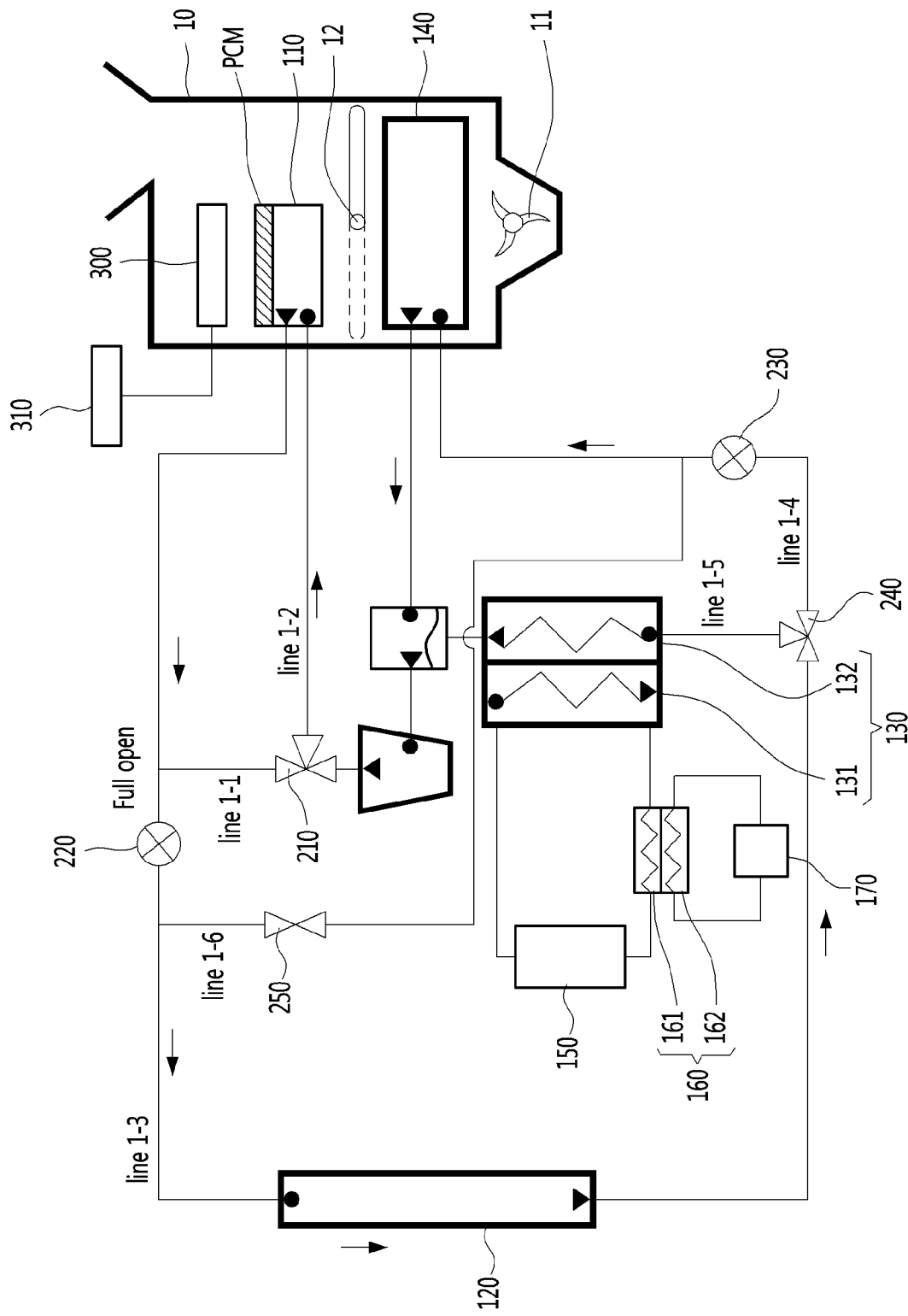
FIG. 4 is a diagram illustrating a circulation path of a refrigerant in a second defrosting operation mode in a configuration of a heat pump system according to another embodiment of the present invention.
Figure 5:
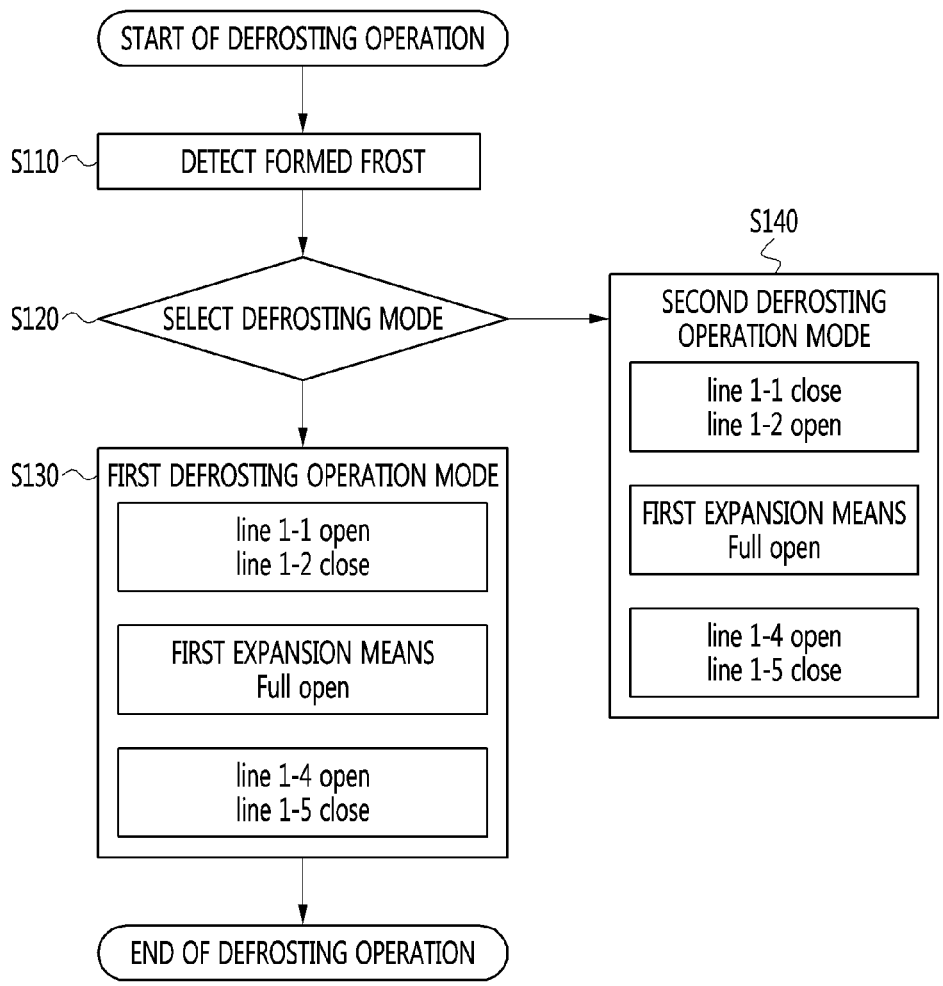
FIG. 5 is a block diagram of a defrosting operation mode of the present invention.
Figure 6:
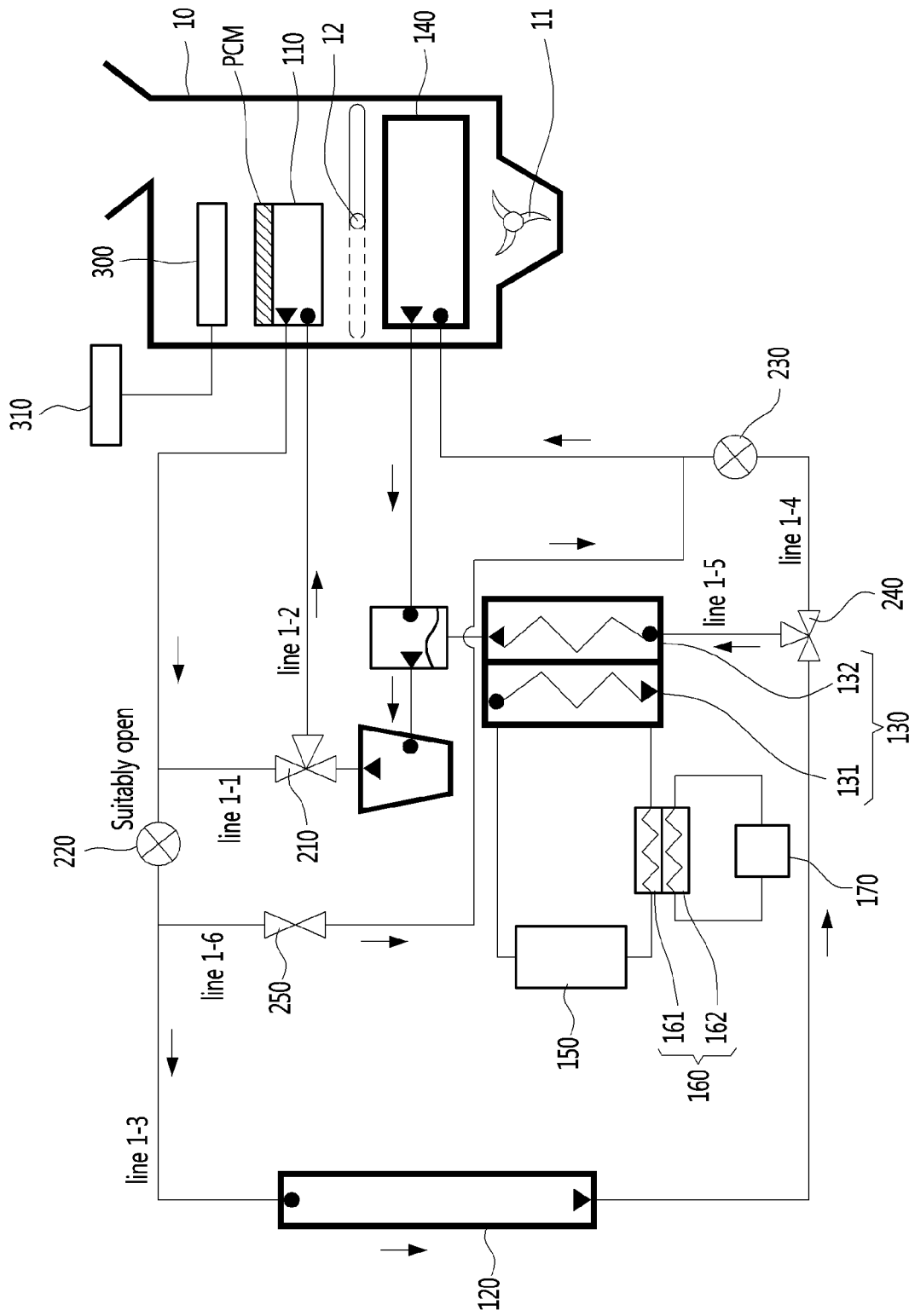
FIG. 6 is a diagram illustrating a circulation path of a refrigerant in a dehumidifying heating operation mode in the configuration of the heat pump system according to the embodiment of the present invention.

FIG. 1 is a diagram illustrating a circulation path of a refrigerant in a cooling operation mode in a configuration of a heat pump system according to an embodiment of the present invention. FIG. 2 is a diagram illustrating a circulation path of a refrigerant in a heating operation mode in the configuration of the heat pump system according to the embodiment of the present invention. FIG. 3 is a diagram illustrating a circulation path of a refrigerant in a first defrosting operation mode in the configuration of the heat pump system according to the embodiment of the present invention. FIG. 4 is a diagram illustrating a circulation path of a refrigerant in a second defrosting operation mode in a configuration of a heat pump system according to another embodiment of the present invention. FIG. 5 is a block diagram of a defrosting operation mode of the present invention. FIG. 6 is a diagram illustrating a circulation path of a refrigerant in a dehumidifying heating operation mode in the configuration of the heat pump system according to the embodiment of the present invention.

First, a configuration of a heat pump for a vehicle according to an embodiment of the present invention is as follows.

The heat pump system of the present invention can be applied to electric vehicles that are driven by only a battery without an internal combustion engine using fossil fuel, and hybrid vehicles in which an internal combustion engine and a battery are mounted at the same time.

The heat pump for a vehicle according to the embodiment of the present invention may include a compressor, a first directional control valve, an inner heat exchanger, a first expansion means, an outer heat exchanger, a second expansion means, a third heat exchanger, and an accumulator which are disposed on a refrigerant line, and at least one waste heat collection part that is disposed parallel to the third heat exchanger.

As a feature of the present invention, a phase change material (PCM) may be provided. PCM is a material that is called a latent heat material, a heat storage material, or a cold storage material and stores and/or releases latent heat energy generated in a process in which a phase change from a solid to a liquid or from a liquid to a gas occurs or a phase change in a direction opposite thereto occurs.

To be more specific, a compressor COMP that compresses and discharges a refrigerant; an inner heat exchanger 110 that allows a heat exchange between the refrigerant and air in an interior of the vehicle; an outer heat exchanger 120 that allows a heat exchange between the refrigerant and open air; a first expansion means 220 that is disposed on a refrigerant line between the inner heat exchanger 110 and the outer heat exchanger 120 and is provided to allow expansion of the refrigerant; a second expansion means 230 that is disposed on a refrigerant line and is provided to allow expansion of the refrigerant that has passed through the outer heat exchanger 120; an accumulator ACC that introduces a gas-phase refrigerant, which is selected from liquid-phase and gas-phase refrigerants in a refrigerant line and has passed through the second expansion means 230, into the compressor COMP; and an evaporator 140 is disposed on a refrigerant line between the second expansion means 230 and the accumulator ACC are disposed on the refrigerant line in which a refrigerant flows. According to the embodiment, a third heat exchanger 130 allowing heat to be exchanged with a waste heat collection part may be disposed.

In addition, the heat pump of the present invention may include a first directional control valve 210 that switches a flow direction of the refrigerant discharged from the compressor COMP.

The refrigerant line may be ramified into a line 1-1 and a line 1-2 by the first directional control valve 210.

The first directional control valve 210 provided on the refrigerant line supplies the refrigerant discharged from the compressor either to the inner heat exchanger 110 or toward the outer heat exchanger 120 without going through the inner heat exchanger 110 according to air conditioning modes of the vehicle. To this end, the first directional control valve 210 may be formed of a 3-way valve. In a case where the first directional control valve 210 is the 3-way valve, an operation for supplying the refrigerant to the outer heat exchanger 120 and an operation for supplying the refrigerant to the inner heat exchanger 110 can be selectively performed.

In a case where the refrigerant flows into the expansion means via the inner heat exchanger during a cooling operation in a conventional heat pump system, a heat pick-up phenomenon may occur due to heat that remains in the inner heat exchanger. However, the first directional control valve 210 immediately discharges a high-temperature high-pressure refrigerant toward the outer heat exchanger 120, and thereby a drop in cooling performance caused by the heat pick-up phenomenon is prevented. That is, the drop in cooling performance can be prevented using the configuration of the first directional control valve 210 of the present invention and the path (e.g. the line 1-1) along which the refrigerant is directly caused to flow toward the outer heat exchanger.

Meanwhile, a pressure sensor (not shown) is mounted on a refrigerant line that couples the compressor COMP and the first directional control valve 210, and thus can detect a pressure of the refrigerant discharged from the compressor COMP in a compressed state. The first directional control valve 210 can be controlled on the basis of information about the detected pressure of the refrigerant.

To be more specific, the first directional control valve 210 prevents a high-temperature high-pressure refrigerant from passing through the inner heat exchanger 110 in a cooling operation mode and a first defrosting operation mode. In this case, the high-temperature high-pressure refrigerant discharged from the compressor COMP passes through the first expansion means 220 that is fully open with no change, and is evaporated at the outer heat exchanger 120.

On the other hand, the first directional control valve 210 allows the refrigerant to pass through the inner heat exchanger 110, and then to be supplied to the first expansion means 220 in a heating operation mode, a second defrosting operation mode, and a dehumidifying-heating operation mode. In this case, the high-temperature high-pressure refrigerant discharged from the compressor COMP is reduced in temperature because it is condensed while passing through the inner heat exchanger 110, and the condensed refrigerant flows toward the outer heat exchanger 120 via the first expansion means 220.

The first expansion means 220 according to the embodiment of the present invention may be an electromagnetic expansion means that is formed to selectively allow full opening of the refrigerant line. An open degree of the refrigerant line can be freely adjusted according to input of a user or a controller. The first expansion means 220 is different from a mechanical expansion means that cannot freely adjust a pressure of the refrigerant line because an open degree is fixed according to a shape of the line.

In addition, the heat pump of the present invention may include a second directional control valve 240 that switches a flow direction of the refrigerant that has passed through the outer heat exchanger 120. The second directional control valve 240 according to the embodiment of the present invention is located between the outer heat exchanger 120 and the second expansion means 230.

The second directional control valve 240 functions to cause the refrigerant that has passed through the outer heat exchanger 120 to flow toward the third heat exchanger 130 or into the second expansion means 230. Like the first directional control valve 210, the second directional control valve 240 may also be a 3-way valve. In a case where the first directional control valve 210 is the 3-way valve, an operation for supplying the refrigerant to the accumulator ACC and an operation for supplying the refrigerant to the second expansion means 240 can be selectively performed.

The third heat exchanger 130 according to the embodiment of the present invention is located between the second directional control valve 240 and the accumulator ACC, and functions to supply waste heat to a refrigerant line.

To be specific, the second directional control valve 240 allows the refrigerant to pass through the second expansion means 230, namely the evaporator 140, and then to be supplied to the accumulator ACC in a cooling operation mode, a first defrosting operation mode, and a second defrosting operation mode. The refrigerant condensed by passing through the outer heat exchanger 120 is subjected to decompression and expansion while passing through the second expansion means 230, and flows into the accumulator ACC via the evaporator 140.

On the other hand, the second directional control valve 240 prevents the refrigerant from passing through the second expansion means 230, namely the evaporator 140, and allows the refrigerant to be directly supplied toward the third heat exchanger 130 in a heating operation mode and a dehumidifying-heating operation mode. In this case, a refrigerant in which a low-temperature low-pressure gas-phase refrigerant evaporated by passing through the outer heat exchanger 120 is mixed with a liquid-phase refrigerant passes through the third heat exchanger 130 is supplied with waste heat and can be subjected to secondary evaporation. The refrigerant passing through the third heat exchanger 130 flows into the accumulator ACC.

The accumulator ACC has a structure that allows only the gas-phase refrigerant of the gas-phase and liquid-phase refrigerants to flow into the compressor COMP, and is formed such that the liquid-phase refrigerant can be stored as needed.

Here, the second expansion means 230 may be a mechanical expansion means in which a pressure difference before and behind the second expansion means 230 according to the shape of the line. In the aspect of cost saving, only the first expansion means 220 is required to have the electromagnetic expansion means in the present invention.

A behavior of the refrigerant caused by the first directional control valve 210 and the second directional control valve 240 will be described in detail below in the method of operating the heat pump.

Meanwhile, a plurality of tubes or wavy fins may be formed in the inner heat exchanger 110 in a side-by-side pattern to provide an inner space in which the refrigerant flows and to exchange heat with air, which flows while being in contact with a surface of the inner heat exchanger 110, in a wider area.

The heat pump of the present invention may include a PCM. The PCM is configured to allow heat storage using heat of the inner heat exchanger 110. According to the embodiment, heat can be stored in the PCM using heat energy that remains after the interior of the vehicle is sufficiently heated through the inner heat exchanger 110.

As illustrated in FIGS. 1 to 4 and 6, the PCM may be configured to be formed integrally with the inner heat exchanger 110.

In a case where the PCM is formed integrally with the inner heat exchanger 110, the PCM shares an outer case with the inner heat exchanger 110, is foamed to adjoin the inner heat exchanger 110, absorbs prescribed heat of vaporization from the inner heat exchanger 110, and uses the heat of vaporization as stored heat energy. If necessary, the PCM may be formed such that the PCM can be attached/detached to/from the inner heat exchanger 110 or the refrigerant line. Thus, in a case where a function of the PCM is deteriorated, the PCM can be replaced.

According to the embodiment of the present invention, the PCM serves to heat the interior of the vehicle as needed using latent heat when a phase change occurs. Here, the latent heat is a type of energy that is released when the PCM changes from a liquid state (a melted state) to a solid state (a frozen state). In the present invention, the PCM serves to assist heating of the interior of the vehicle according to refrigerant circulation. Especially, the PCM can be configured to release the latent heat when frost is formed on the outer heat exchanger 120 and defrosting is required. In the related art, a problem that heating performance is reduced during a defrosting operation in view of a structure of the heat pump occurs. However, in the present invention, heating using the PCM during defrosting can be performed to prevent a reduction in heating performance.

For example, freezing and melting points of the PCM may be set to about 50° C. and 70° C., respectively. The PCM is subjected to a phase change within a range between the freezing point and the melting point, and thereby the PCM can store heat of the refrigerant or release heat to the refrigerant.

The PCM stores the heat energy generated from the inner heat exchanger 110 during a heating operation first, and releases the latent heat when defrosting is required later. To be specific, the PCM stores heat while being melted in a heating operation mode, and releases heat while being cooled (or frozen) when frosting occurs at the outer heat exchanger, that is, when a defrosting operation is required.

The defrosting operation mode of the present invention may include a first defrosting operation mode and a second defrosting operation mode. The first defrosting operation mode may correspond to an operation mode in which the PCM releases heat. A singular point in the first defrosting operation mode and the second defrosting operation mode is that, after the first expansion means 220 is put in a full open state, and the second expansion means 230 decompresses and expands the refrigerant, only a flow of the refrigerant on the refrigerant line is switched using the first directional control valve 210. The first defrosting operation mode, the second defrosting operation mode, and the consequent behavior of the PCM will be described below in detail in the method of operating the heat pump.

Meanwhile, the waste heat collection part according to the embodiment of the present invention may be divided into an electronic component waste heat collection part 150 and a cabin room waste heat collection part 170.

The electronic component waste heat collection part 150 and the cabin room waste heat collection part 170 may be disposed parallel to the refrigerant line of the present invention. According to the embodiment, the electronic component waste heat collection part 150 and the cabin room waste heat collection part 170 may be formed through a fluid line formed separately from the refrigerant line of the third heat exchanger 130, and provide waste heat of electronic components and/or a cabin room to the refrigerant line via the third heat exchanger 130. A temperature of the refrigerant flowing into the compressor COMP using the waste heat provided to the refrigerant line can be raised, so that electric power required to drive the compressor can be cut, and heating ability can be improved when a temperature of open air is low.

The third heat exchanger 130 of the present invention may be divided into a waste heat side heat exchanger 131 and a refrigerant side heat exchanger 132. The third heat exchanger 130 transfers heat energies of two different fluids that meet each other. Since a separate heat provider is not coupled to the third heat exchanger 130, heat is transferred from a fluid having a higher temperature to a fluid having a low temperature according to the third law of thermodynamics. The fluids meeting at the third heat exchanger 130 are not to be mixed with each other. To this end, the third heat exchanger 130 is preferably formed in a shape of a chiller that is widely used as a cooler. According to the embodiment, any one of electronic component waste heat and cabin room waste heat can be collected and transferred to the refrigerant line through the third heat exchanger 130 during heating, and both the electronic component waste heat and the cabin room waste heat can be collected and transferred to the third heat exchanger 130 during strong heating.

As illustrated in FIG. 1, the electronic component waste heat collection part 150 and the cabin room waste heat collection part 170 may also be disposed parallel to each other. To be specific, the cabin room waste heat collection part 170 may be disposed parallel to a fluid line of the electronic component waste heat collection part 150, and may provide waste heat of a cabin room waste heat to the fluid line of the electronic component waste heat collection part 150 via a fourth heat exchanger 160. For reference, the category of the present invention is not limited to FIG. 1. For example, unlike FIG. 1, a case where dispositions of the electronic component waste heat collection part 150 and the cabin room waste heat collection part 170 are mutually exchanged may be included in the embodiment of the present invention, and if waste heat can be provided to the refrigerant line, other embodiments may be included in the category of the present invention.

An electronic component coupled to the electronic component waste heat collection part 150 may refer to a product capable of generating heat such as a motor, an inverter, a converter, a battery, or the like. The waste heat of the cabin room coupled to the cabin room waste heat collection part 170 may refer to all types of waste heat provided from an interior and exterior of the cabin room, and may include, for example, heat provided from a heating means that is separately provided for heating, a solar panel that is installed on a surface of the vehicle above the cabin room and collects solar energy, or the like.

Meanwhile, the heat pump according to the embodiment of the present invention may separately include a PTC heater 300. The PTC heater 300 is installed inside an air conditioner case 10 or a duct, is connected to a battery 310 for the PTC heater, and heats an interior of the air conditioner case to a temperature which a passenger of the vehicle wants. The PTC heater 300 assists the heating operation mode of the heat pump according to the embodiment of the present invention and contributes to raise a heating temperature to a desired temperature within a short time.

Hereinafter, the method of operating the heat pump for a vehicle of the present invention will be described in greater detail with reference to the drawings.

On/off of the cooling operation mode, the heating operation mode, the defrosting operation mode, and the dehumidifying-heating operation mode of the present invention, adjustment of an in-vehicle temperature according to the air conditioning modes, and a behavior of the valve for switching between the air conditioning modes can be automatically adjusted and operated by selection of a user or a controller of the vehicle. Here, the controller may refer to a vehicle control unit (VCU) provided in the vehicle.

The controller detects a pressure of the refrigerant which is received through a pressure sensor (not shown) and a temperature of the refrigerant which is received through a temperature sensor (not shown) to drive each valve in each air conditioning mode to be described below, and adjusts an open degree of each expansion means and an open degree of an ON-OFF valve. Meanwhile, as described above, the first expansion means 220 is formed as the electromagnetic expansion means, and can very rapidly reflect control input of the controller on the heat pump system of the present invention. Further, the controller can function to control opening/closing of a door and an amount of wind of a fan. In addition, the controller determines whether or not the waste heat collection part collects waste heat, whether or not the waste heat collection part provides a heat value, a heat valve provision time, etc. according to a heating load required for the vehicle or the air conditioning modes of the vehicle.

According to the method of operating the heat pump for a vehicle of the present invention, the compressor COMP, the first directional control valve 210, the inner heat exchanger 110, the first expansion means 220, the outer heat exchanger 120, the second directional control valve 240, the second expansion means 230, the third heat exchanger 130, and the accumulator ACC are disposed on the refrigerant line, and the PCM is disposed on one side of the inner heat exchanger 110. The method of operating the heat pump includes: supplying a refrigerant discharged from the compressor COMP either to the inner heat exchanger 110 or toward the outer heat exchanger 120 without going through the inner heat exchanger 110 using the first directional control valve 210 according to air conditioning modes of the vehicle; supplying the refrigerant which has passed through the outer heat exchanger 120 either to the second expansion means 230 or toward the third heat exchanger 130 without going through the second expansion means 230 using the second directional control valve 240; and forming a dehumidification line that directly supplies the refrigerant to a rear end of the second expansion means at a rear end of the first expansion means, and an ON-OFF valve that opens/closes the dehumidification line, wherein a cooling operation, a heating operation, a first defrosting operation, a second defrosting operation, and a dehumidifying-heating operation are performed by behaviors of the first directional control valve, the second directional control valve, and the ON-OFF valve of the dehumidification line.

The cooling operation mode of the present invention will be described with reference to FIG. 1.

The cooling operation mode is characterized by causing the refrigerant to pass through the compressor COMP, the first expansion means 220, the outer heat exchanger 120, the second expansion means 230, the evaporator 140, the accumulator ACC, and the compressor COMP in order, and fully opening the first expansion means 220.

Here, a path (a line 1-2) of the first directional control valve 210 which is directed toward the inner heat exchanger 110 is closed, and only a path (line 1-1) coupled directly toward the outer heat exchanger 120 is open. In the present invention, to be coupled directly toward the outer heat exchanger 120 includes to be coupled toward the outer heat exchanger 120 through the first expansion means 220 put in a full open state.

In this case, the first expansion means 220 is fully opened to minimize a pressure drop and a state change of the refrigerant. Thus, a high-temperature high-pressure gas-phase refrigerant discharged from the compressor COMP passes through the first expansion means 220 with no change, then meets cold open air at the outer heat exchanger 120, and is condensed while exchanging heat with the cold open air. As a result, the gas-phase refrigerant is changed to a liquid-phase refrigerant.

The second directional control valve 240 closes a path (a line 1-5) that supplies the refrigerant to the third heat exchanger 130, and opens only a path (a line 1-4) directed toward the second expansion means 230.

Continuously, the refrigerant passing through the outer heat exchanger 120 is decompressed and expanded to become a low-temperature low-pressure liquid-phase refrigerant in a process of passing through the second expansion means 230 past the second directional control valve 240, and then flows toward the evaporator 140.

The low-temperature low-pressure liquid-phase refrigerant flowing toward the evaporator 140 is supplied toward the air conditioner case 10, cools air supplied by a fan 11 in the air conditioner case 10, and thereby performs cooling. In this process, a door 12 blocks a flow of air toward the inner heat exchanger 110, and immediately discharges air, which flows into the air conditioner case 10, meets the evaporator 140, and is cooled, into the interior of the vehicle.

Afterward, a refrigerant in which low-temperature low-pressure gas-phase and liquid-phase refrigerants are mixed passes through the accumulator ACC, and flows into the compressor COMP again. The accumulator ACC separates a liquid-phase refrigerant and a gas-phase refrigerant from a refrigerant to be supplied to the compressor COMP, and allows only the gas-phase refrigerant to be supplied to the compressor COMP. The separated liquid-phase refrigerant can be stored.

In this way, the refrigerant circulates during the cooling operation.

That is, the refrigerant in the cooling operation mode is discharged from the compressor, passes through the first expansion means 220 that is fully open with no change, is condensed at the outer heat exchanger 120, is decompressed and expanded at the second expansion means 230, and is evaporated at the evaporator 140 in order. The cooled refrigerant meets the air flowing into the air conditioner case 10 to cool the interior of the vehicle.

The heating operation mode will be described with reference to FIG. 2.

The heating operation mode is characterized by causing the refrigerant to pass through the compressor COMP, the inner heat exchanger 110, the first expansion means 220, the outer heat exchanger 120, the third heat exchanger 130, the accumulator ACC, and the compressor COMP in order.

Here, the first directional control valve 210 is driven, so that the path (the line 1-2) directed toward the inner heat exchanger 110 is open, and the path (the line 1-1) coupled directly toward the outer heat exchanger 120 is closed. Thus, the high-temperature high-pressure gas-phase refrigerant discharged from the compressor flows toward the inner heat exchanger 110.

The high-temperature high-pressure gas-phase refrigerant flowing toward the inner heat exchanger 110 is condensed while exchanging heat with air flowing into the air conditioner case 10 through the fan 11, and thus is changed to a liquid-phase refrigerant. After air passing through the inner heat exchanger 110 is changed to warm air, the warm air is supplied to the interior of the vehicle, and heats the interior of the vehicle.

The refrigerant passing through the inner heat exchanger 110 is decompressed and expanded while passing through the first expansion means 220, and thus becomes a low-pressure liquid-phase refrigerant. This liquid-phase refrigerant is supplied to the outer heat exchanger 120. The liquid-phase refrigerant is evaporated at the outer heat exchanger 120, is changed to a refrigerant in which a gas-phase refrigerant and a liquid-phase refrigerant are mixed, passes through the third heat exchanger 130, and flows toward the accumulator ACC. The refrigerant at the third heat exchanger 130 can be secondarily evaporated by the third heat exchanger 130.

The second directional control valve 240 opens the path (the line 1-5) that supplies the refrigerant to the third heat exchanger 130, and closes the path (the line 1-4) directed toward the second expansion means 230.

The refrigerant flowing toward the third heat exchanger 130 can change heat with the fluid line separately provided for the waste heat collection part. Here, the heat exchange can be selectively performed, and is performed in such a way that the refrigerant is supplied with heat from the fluid line for the waste heat collection part when heating performance is intended to be improved mainly by further raising a temperature of the refrigerant. For example, in a case where a temperature outside the vehicle is in a low state lower than or equal to a prescribed temperature (e.g., 10° C. below zero), a heating load required for the vehicle can be satisfied by performing an operation mode (a high heating operation mode) that is positively supplied with waste heat from the waste heat collection part along with heating performance caused by a flow of a typical refrigerant.

According to the embodiment, the waste heat collection part may include the electronic component waste heat collection part 150 and the cabin room waste heat collection part 170. Furthermore, waste heat is supplied from at least one of the electronic component waste heat collection part 150, or the cabin room waste heat collection part 170, and the heating performance can be improved. The refrigerant which is relatively low in temperature and pressure when flowing into the third heat exchanger 130 and in which gas-phase and liquid-phase refrigerants are mixed becomes a refrigerant which is relatively high in temperature and low in pressure while passing through the third heat exchanger 130 and in which gas-phase and liquid-phase refrigerants are mixed, and flows toward the accumulator ACC. This operation results in raising efficiency of the compressor COMP to increase heating efficiency.

In this process, the door 12 opens the flow of air toward the inner heat exchanger 110, and discharges air, which flows into the air conditioner case 10, meets the inner heat exchanger 110, and is heated, into the interior of the vehicle. Thereby, heating is performed.

To arrange the heating operation mode again, the refrigerant is discharged from the compressor COMP, is condensed at the inner heat exchanger 110, is decompressed and expanded at the first expansion means 220, is evaporated at the outer heat exchanger 120, and selectively exchanges heat at the third heat exchanger 130 in order. The PCM provided on one side of the inner heat exchanger 110 in the present embodiment can store heat that is left or supercharged in the air conditioner case 10 during the heating operation.

The defrosting operation mode will be described with reference to FIGS. 3 to 5.

In the present invention, the defrosting operation mode includes the first defrosting operation mode and the second defrosting operation mode. The first defrosting operation mode refers to an operation mode that increases a defrosting speed by causing a high-temperature refrigerant to directly flow into the outer heat exchanger 120. In this case, behaviors of the first directional control valve 210 and the second directional control valve 240 are similar to those during the cooling operation of the heat pump. The second defrosting operation mode refers to an operation mode that performs a defrosting operation without deteriorating the heating performance. In this case, a behavior of the first directional control valve 210 is similar to that during the heating operation, and a behavior of the second directional control valve 240 is similar to that during the cooling operation of the heat pump.

First, the first defrosting operation mode illustrated in FIG. 3 is characterized by causing the refrigerant to pass through the compressor COMP, the first expansion means 220, the outer heat exchanger 120, the second expansion means 230, the evaporator 140, the accumulator ACC, and the compressor COMP in order, and fully opening the first expansion means 220.

Here, a path (a line 1-2) of the first directional control valve 210 which is directed toward the inner heat exchanger 110 is closed, and only the path (the line 1-1) directly coupled toward the outer heat exchanger 120 is open.

In this case, the first expansion means 220 is fully open, and minimizes a pressure drop and a state change of the refrigerant. Thus, the high-temperature high-pressure gas-phase refrigerant discharged from the compressor COMP passes through the first expansion means 220 with no change, then meets cold open air at the outer heat exchanger 120, and is condensed while exchanging heat with the cold open air. As a result, the gas-phase refrigerant is changed to a liquid-phase refrigerant.

The second directional control valve 240 closes the path (the line 1-5) that directly supplies the refrigerant to the third heat exchanger 130, and opens only the path (the line 1-4) directed toward the second expansion means 230.

Continuously, the refrigerant passing through the outer heat exchanger 120 is decompressed and expanded to become a low-temperature low-pressure liquid-phase refrigerant in a process of passing through the second expansion means 230 past the second directional control valve 240, and then flows toward the evaporator 140.

In the first defrosting operation mode, the high-temperature high-pressure gas-phase refrigerant is directly supplied to the outer heat exchanger 120 on which frost is formed, and thereby performs defrosting. The refrigerant flowing into the outer heat exchanger 120 is a high-temperature refrigerant of about 90° C., meets open air at the outer heat exchanger 120, and removes frost famed on a surface of the outer heat exchanger 120 while exchanging heat with the open air. If the heating operation is performed when the open air is cold, a problem that frost is formed on the surface of the outer heat exchanger 120 by an endothermic action of the outer heat exchanger 120 may occur. In this case, the defrosting operation mode illustrated in FIG. 3 is applied, and thereby the formation of frost can be previously prevented or remove the foamed frost.

Here, a noticeable point is that the behaviors of the first directional control valve 210 and the second directional control valve 240 in the first defrosting operation mode of the present embodiment are similar to those during the cooling operation of the heat pump.

Meanwhile, in the embodiment of the present invention, the interior of the vehicle can be heated using latent heat of the PCM during the defrosting operation of the outer heat exchanger 120.

To be specific, the interior of the vehicle can be kept warm using a phenomenon that releasing heat when the PCM that has sufficiently stored heat is cooled, i.e. when the PCM is cooled (or frozen). The use of the PCM allows heating performance to be maintained to some extent while performing a defrosting function.

The second defrosting operation mode will be described with reference to FIG. 4.

As described above, the second defrosting operation mode may refer to performing the defrosting operation during the heating operation. Thus, the second defrosting operation mode may be referred to as a defrosting-heating operation mode.

The second defrosting operation mode is characterized by causing the refrigerant to pass through the compressor COMP, the inner heat exchanger 110, the first expansion means 220, the outer heat exchanger 120, the second expansion means 230, the evaporator 140, the accumulator ACC, and the compressor COMP in order, and fully opening the first expansion means 220.

In a case where defrosting is required during the heating operation, the defrosting is performed without stopping the heating operation, and thus a phenomenon in which a heat value for the heating is reduced is prevented.

Here, the first directional control valve 210 is driven, so that the path (the line 1-2) directed toward the inner heat exchanger 110 is open, and the path (the line 1-1) coupled directly toward the outer heat exchanger 120 is closed. Thus, the high-temperature high-pressure gas-phase refrigerant discharged from the compressor flows toward the inner heat exchanger 110.

The high-temperature high-pressure gas-phase refrigerant flowing toward the inner heat exchanger 110 is condensed while exchanging heat with air flowing into the air conditioner case through the fan 11, and thus is changed to a liquid-phase refrigerant. After air passing through the inner heat exchanger 110 is changed to warm air, the warm air is supplied to the interior of the vehicle, and heats the interior of the vehicle.

Continuously, the first expansion means 220 is fully open and minimizes a pressure drop and a state change of the refrigerant. The refrigerant passing through the inner heat exchanger 110 can meet open air at the outer heat exchanger 120, and is condensed again while exchanging heat with the open air.

In this case, since the refrigerant maintains heat when discharged from the compressor COMP to some extent (about from 40° C. to 50° C.), it is possible to prevent frost from being formed at the outer heat exchanger 120 or remove the formed frost. In other words, the refrigerant passing through the inner heat exchanger 110 circulates to the outer heat exchanger 120 in a medium-temperature high-pressure state without expansion, and thereby exerts an improved defrosting ability and has an advantage that exerts a defrosting effect through a simple valve operation while maintaining the heating performance. In this case, since a temperature of the refrigerant supplied to the outer heat exchanger 120 is low compared to the first defrosting operation mode, a defrosting speed in the second defrosting operation mode may be somewhat slower than that in the first defrosting operation mode.

In this case, the second directional control valve 240 opens the path (the line 1-5) directed toward the third heat exchanger 130, and closes only the path (the line 1-4) directed toward the second expansion means 230.

The refrigerant passing through the outer heat exchanger 120 is decompressed and expanded while passing though the second expansion means 230 past the second directional control valve 240, becomes a low-temperature low-pressure gas-phase refrigerant, and then flows into the evaporator 140. The low-temperature low-pressure gas-phase refrigerant is evaporated by meeting air flowing in from the outside at the evaporator 140, so that it is changed to low-temperature low-pressure gas-phase and liquid-phase refrigerants, and flows toward the accumulator ACC. Since air that flows into the air conditioner case 10 and is cooled at the evaporator 140 is heated again while passing through the inner heat exchanger 110, the heating performance can be properly maintained.

That is, in the second defrosting operation mode, the refrigerant is discharged from the compressor, is condensed at the inner heat exchanger 110, passes through the first expansion means 220 that is fully open with no change, is re-condensed at the outer heat exchanger 120, is decompressed and expanded at the second expansion means 230, and is evaporated at the evaporator 140 in order. In the present embodiment, the PCM can store heat that is left or supercharged in the air conditioner case 10 during the heating operation.

The defrosting operation mode is emphasized again.

As illustrated in FIG. 5, in a case where a formed frost is detected (S110), any one of the first defrosting operation mode and the second defrosting operation mode can be selected to operate the heat pump.

As a method of detecting that frost is formed on the outer heat exchanger 120, a method of photographing an amount of a formed frost using a prescribed photographing device and identifying the amount of the formed frost, a method of forming electrodes and an electronic device for forming a prescribed electric field to detect an amount of a formed frost according to a change in the electric field, or a method of detecting a formed frost using an infrared ray or a pressure sensor may be applied. In addition, it may be determined whether or not frost is formed by directly detecting a formed frost using another sensor attached to the outer heat exchanger, or by considering both a speed of the vehicle and a temperature of the open air in addition to the aforementioned information.

The defrosting operation modes may be automatically selected according to selection of a user or a preset algorithm. A reference of the selection may include (a) an amount of a formed frost, (b) whether or not the PCM is used or a degree of heat storage of the PCM, or (c) a temperature of open air.

Since a high-temperature refrigerant flows toward the outer heat exchanger 120 in the first defrosting operation mode, a defrosting operation speed is fast. In the first defrosting operation mode, stored heat is released from the PCM, and heats the interior of the vehicle.

Since a medium-temperature refrigerant lower than the high-temperature refrigerant in the first defrosting operation mode flows toward the outer heat exchanger 120 in the second defrosting operation mode, the second defrosting operation mode has a slower defrosting operation speed than the first defrosting operation mode, but has an advantage that a reduction in heating performance can be prevented when the defrosting operation is performed.

For example, since a defrosting time is long when the amount of the formed frost is more than a preset amount A, the second defrosting operation mode may be set to be performed. When the amount of the formed frost is not more than the preset amount A, the first defrosting operation mode may be set to be operated. The defrosting operation modes may be set to be performed step by step according to the amount of the formed frost.

The second defrosting operation mode is meaningful when the PCM cannot be used or heat is not sufficiently stored in the PCM when the defrosting operation is performed.

Further, even in a case where the temperature of the open air is lower than or equal to, for example, a preset temperature (e.g., 0° C.), the defrosting operation modes may be set to be performed. After the preset temperature is divided according to a range, the first defrosting operation mode may be set to be performed, for example, at a temperature of −5° C. to 0° C., and the second defrosting operation mode may be set to be performed at a temperature of −5° C. or lower.

Next, the dehumidifying-heating operation mode will be described with reference to FIG. 6.

The dehumidifying-heating operation mode is characterized by causing the refrigerant to pass through the compressor COMP, the inner heat exchanger 110, the first expansion means 220, the outer heat exchanger 120, the third heat exchanger, the accumulator, and the compressor in order, partly ramifying a flow of the refrigerant to a dehumidification line (a line 1-6), and supplying the refrigerant toward the evaporator.

Here, the path (the line 1-2) of the first directional control valve 210 which is directed toward the inner heat exchanger 110 is open, and the path (the line 1-1) directly coupled toward the outer heat exchanger 120 is closed. Thus, the high-temperature high-pressure gas-phase refrigerant discharged from the compressor flows toward the inner heat exchanger 110.

The high-temperature high-pressure gas-phase refrigerant flowing toward the inner heat exchanger 110 is condensed while exchanging heat with air flowing into the air conditioner case through the fan, and thus is changed to a liquid-phase refrigerant. After air passing through the inner heat exchanger 110 is changed to warm air, the warm air is supplied to the interior of the vehicle, and heats the interior of the vehicle.

The refrigerant passing through the inner heat exchanger 110 is decompressed and expanded to become a low-pressure liquid-phase refrigerant while passing through the first expansion means 220, and then is supplied to the outer heat exchanger 120 acting as an evaporator. In this case, the second directional control valve 240 opens the path (the line 1-5) that supplies the refrigerant to the third heat exchanger 130, and closes the path (the line 1-4) directed toward the second expansion means 230. The refrigerant supplied to the outer heat exchanger 120 becomes a mixture of low-temperature low-pressure gas-phase and liquid-phase refrigerants, and flows toward the third heat exchanger 130. In this case, the refrigerant can be secondarily evaporated at the third heat exchanger 130.

The heat exchange at the third heat exchanger 130 can be selectively performed, and is performed in such a way that the refrigerant is supplied with heat from the fluid line for the waste heat collection part when heating performance is intended to be improved mainly by further raising a temperature of the refrigerant. For example, in a case where a temperature outside the vehicle is in a low state lower than or equal to a prescribed temperature (e.g., 10° C. below zero), a heating load required for the vehicle can be satisfied by performing an operation mode (a high heating operation mode) that is positively supplied with waste heat from the waste heat collection part along with heating performance caused by a flow of a typical refrigerant.

Meanwhile, in the dehumidifying-heating operation mode according to the embodiment of the present invention, the dehumidification line (the line 1-6) and the ON-OFF valve 250 for opening/closing the dehumidification line are formed, and a part of the refrigerant that is decompressed and expanded by the first expansion means 220 during the dehumidifying-heating operation can immediately flow toward the evaporator 140.

A high-temperature refrigerant flows toward the evaporator 140, and thereby a dehumidifying operation can be performed.

To be specific, if it is determined by a humidity sensor (not shown) in the air conditioner case that humidity is high, wet air flowing in by the fan is condensed by coming into contact with a surface of the evaporator 140, and the air coming into contact with the evaporator 140 is transferred toward the inner heat exchanger 110 during an exothermic action using the door 12. As a result, dry air from which moisture is removed is discharged to the interior of the vehicle.

As described above, according to the present invention, a more excellent heat pump system than the related art in the aspect of defrosting efficiency is proposed. In the present invention, the refrigerant passing through the inner heat exchanger can circulate to the outer heat exchanger in a high-temperature or medium-temperature state without expansion, and thus defrosting performance is exerted.

In addition, according to the embodiment, the present invention has an effect capable of shortening the defrosting time, and an advantage capable of preventing a phenomenon in which the heating performance is reduced during the defrosting operation.

In the above detailed description of the present invention, only the consequent special embodiment has been described. However, it should be understood that the present invention is not limited in a special form set forth in the detailed description and rather covers all modifications, equivalents, and substitutions without departing from the spirit and scope of the present invention defined by the attached claims.

The invention claimed is:

1. A heat pump for a vehicle, comprising:
a compressor configured to compress and discharge a refrigerant;
an inner heat exchanger configured to allow a heat exchange between the refrigerant and air in an interior of the vehicle;
an outer heat exchanger configured to allow a heat exchange between the refrigerant and open air;
a first directional control valve configured to be a 3-way valve and selectively supply the refrigerant discharged from the compressor either to the inner heat exchanger or toward the outer heat exchanger without going through the inner heat exchanger according to air conditioning modes of the vehicle;
a first expansion means disposed on a refrigerant line between the inner heat exchanger and the outer heat exchanger and provided to allow expansion of the refrigerant;
a second expansion means disposed on the refrigerant line and provided to allow expansion of the refrigerant that has passed through the outer heat exchanger;
an evaporator provided at a rear end of the second expansion means;
an accumulator configured to introduce a gas-phase refrigerant, which is selected from liquid-phase and gas-phase refrigerants in the refrigerant line, into the compressor;
a third heat exchanger provided to exchange heat with a waste heat collection part on the refrigerant line formed to allow the refrigerant to flow into the accumulator without passing through the evaporator; and
a second directional control valve configured to be a 3-way valve and selectively supply the refrigerant which has passed through the outer heat exchanger either to the second expansion means or toward the third heat exchanger without going through the second expansion means,
wherein the air conditioning modes of the vehicle include a cooling operation mode, a heating operation mode, a first defrosting operation mode and a second defrosting operation mode according to operations of the first and second directional control valves,
wherein in the cooling operation mode, the first and second directional control valves are operated to cause the refrigerant to pass through the compressor. the first expansion means, the outer heat exchanger, the second expansion means, the evaporator, and the accumulator in this order,
wherein in the heating operation mode, the first and second directional control valves are operated to cause the refrigerant to pass through the compressor, the inner heat exchanger, the first expansion means, the outer heat exchanger, the third heat exchanger, the accumulator, and the compressor in this order,
wherein in the first defrosting operation mode, the first and second directional control valves are operated to cause the refrigerant to pass through the compressor, the first expansion means, the outer heat exchanger, the second expansion means, the evaporator, the accumulator, and the compressor in this order,
wherein in the second defrosting operation mode, the first and second directional control valves are operated to cause the refrigerant to pass through the compressor, the inner heat exchanger, the first expansion means, the outer heat exchanger, the second expansion means, the evaporator, the accumulator, and the compressor in this order,
wherein a phase change material (PCM) is detachably connected or integrally formed with the inner heat exchanger such that the PCM is configured to store heat generated from the inner heat exchanger on the refrigerant line when the vehicle is operated in the heating operation mode, and such that when the outer heat exchanger is frosted, the PCM is further configured to release the stored heat in the first defrosting operation mode in which the refrigerant is discharged toward the outer heat exchanger without passing through the inner heat exchanger to defrost the outer heat exchanger,
wherein the heat pump is used in an electric vehicle or a hybrid vehicle.

2. The heat pump according to claim 1, wherein the third heat exchanger is coupled parallel to the evaporator on the refrigerant line between the second directional control valve and the accumulator.

3. The heat pump according to claim 2, wherein the waste heat collection part includes an electronic component waste heat collection part and a cabin room waste heat collection part.

4. The heat pump according to claim 1, wherein the first expansion means is an electromagnetic expansion means that is formed to selectively allow full opening of the refrigerant line.

5. The heat pump according to claim 1, further comprising:
a dehumidification line configured to directly supply the refrigerant to a rear end of the second expansion means at a rear end of the first expansion means, and
an ON-OFF valve configured to open/close the dehumidification line.

* * * * *